(12) United States Patent  
Caprini et al.

(10) Patent No.: US 7,792,692 B2  
(45) Date of Patent: *Sep. 7, 2010

(54) ADAPTIVE ESTIMATION OF GAIN AND REVENUE

(75) Inventors: Carlo Giovanni Caprini, Ruemlang (CH); Reto Gruenenfelder, Dietlikon (CH)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/173,466

(22) Filed: Jul. 15, 2008

(65) Prior Publication Data

US 2008/0275749 A1      Nov. 6, 2008

Related U.S. Application Data

(63) Continuation of application No. 11/119,276, filed on Apr. 29, 2005, now Pat. No. 7,516,081.

(51) Int. Cl.
*G06F 17/50* (2006.01)
*G06F 17/00* (2006.01)
*G06F 17/10* (2006.01)

(52) U.S. Cl. ............................. 705/7; 705/400; 703/2

(58) Field of Classification Search ............... 705/7–10, 705/1, 400, 1.1, 14.1, 14.13, 14.35; 703/2, 703/6

See application file for complete search history.

(56) References Cited

U.S. PATENT DOCUMENTS

| 5,987,425 | A   | * | 11/1999 | Hartman et al. ............... 705/20 |
| 7,133,848 | B2  |   | 11/2006 | Phillips et al. |
| 7,321,865 | B2  |   | 1/2008  | Kelly et al. |
| 2002/0116348 | A1 |   | 8/2002  | Phillips et al. |
| 2003/0130883 | A1 |   | 7/2003  | Schroeder et al. |
| 2004/0034555 | A1 | * | 2/2004  | Dismukes et al. ............... 705/7 |
| 2004/0039676 | A1 |   | 2/2004  | Trainer |
| 2004/0215545 | A1 |   | 10/2004 | Murakami et al. |
| 2005/0149377 | A1 | * | 7/2005  | Schierholt ..................... 705/10 |
| 2006/0184414 | A1 |   | 8/2006  | Pappas et al. |

OTHER PUBLICATIONS

Apps et al., Life Cycle Time Allocation and Saving in an Imperfect Capital Market, University of Sydney and Ray Rees University of Munich and University of York, Dec. 2003.

Schut et al., Managed Competition and Consumer Price Sensitivity in Social Health Insurance, Internet print-out, Aug. 2002.

Kerbache et al., Queueing Networks and the Topological Design of Supply Chain Systems, International Journal of Production Economics, V91, Issue 3, Oct. 2004.

Sullivan, M. A., Practical Aspects of Dynamic Revenue Estimation, Internet print-out, Jun. 2004.

\* cited by examiner

*Primary Examiner*—Igor Borissov
(74) *Attorney, Agent, or Firm*—Scully, Scott, Murphy & Presser, P.C.; Louis J. Percello, Esq.

(57) ABSTRACT

Exemplary embodiments of the invention relate to a method, system, and storage medium for facilitating adaptive estimation of gains and revenues. The method includes receiving initial the data for at least one subject to be measured into an adaptive estimator system. The initial the data includes an estimated cost of the subject, a number of clock cycles for the subject, an initial gain function based upon a desired profit, and a measurement period. The method also includes capturing a number of used units during a current clock cycle. Based upon the initial data and the captured used units, the method includes computing an actual gain.

28 Claims, 5 Drawing Sheets

ADAPTIVE ESTIMATION OF GAIN AND REVENUE

RELATED APPLICATIONS

This application is a continuation of U.S. Ser. No. 11/119,276, filed on Apr. 29, 2005, the entire contents of which are incorporated herein by reference.

This invention relates to a method, and a system, for adaptively estimating gains and revenues for activities using a limited amount of resources.

BACKGROUND OF THE INVENTION

Determining optimum pricing policies can be a daunting task. If a business charges prices for goods and/or services that are too high, they may chase away the customer entities. If a business charges prices that are too low, then potential revenues are burdened. Frequent fluctuations in market conditions play a role in determining pricing policies, as they drive demand up or down for these goods and services. As more of today's industries are moving toward an on-demand business model where goods are manufactured, delivered, or services provided 'on-demand', it becomes increasingly difficult to keep pace with assessing current and future pricing policies in light of market dynamics and other unforeseen factors.

What is needed, therefore, is a way to continuously provide up-to-date revenue and gain information for a business, thereby enabling to determine more effective and accurate pricing policies. The 'on demand' provisioning of manufactured goods, services etc, requires a faster reaction on changing demands. Therefore, it is advantageous if the pricing policies of the 'on demand' service providers change in accordance to the fast changing demand. If the change is within a certain limit, e.g. less than 5% cost increase, the change may be absorbed by a slight reduction of the enterpise's gain. If considerable changes occur, however, the enterprise then wants to get alerted prior to the change. This alert is typically performed based on a prediction (estimation) of the future, based on historic data.

BRIEF SUMMARY OF THE INVENTION

This text suggests in the following a method on how to predict revenue and gain in an 'on demand' business and how to change the parameters, particularly gain and cost, such that the enterprise can realize the expected gain and revenue as the business case foresees.

The above drawbacks and disadvantages are overcome or alleviated by a method and system for adaptively estimating gain and revenue. The method includes receiving initial data for at least one subject to be measured, said initial data including a duration of a measurement period, a number of clock cycles for said at least one subject during said duration of said measurement period, an initial value of a total cost of said at least one subject over the duration of said measurement period, and an initial gain function, capturing a number of used units of said subject during a current clock cycle, determining the gain for said current clock cycle based upon said captured number of used units and said gain function, and determining a revenue based on said received initial data and said captured number of used units.

BRIEF DESCRIPTION OF THE DRAWINGS

Referring now to the drawings wherein like elements are numbered alike in the several FIGURES.

DETAILED DESCRIPTION OF PREFERRED EMBODIMENTS OF THE INVENTION

The adaptive estimator model of the invention may be used for developing pricing policies in an on-demand environment, and may be particularly useful for managing on-line transactions. Embodiments of the invention utilize measurement of input samples for a subject of measurement and simulating or assessing the revenue, gain, and the average used units associated with the subject of measurement. Embodiments also include cumulating the revenue and gain after each sample. Based upon the average measured used units, the adaptive estimator system further provides forecasts for an upper and a lower bound of the revenue and gain that will be achieved during the measurement period.

Figure 1:
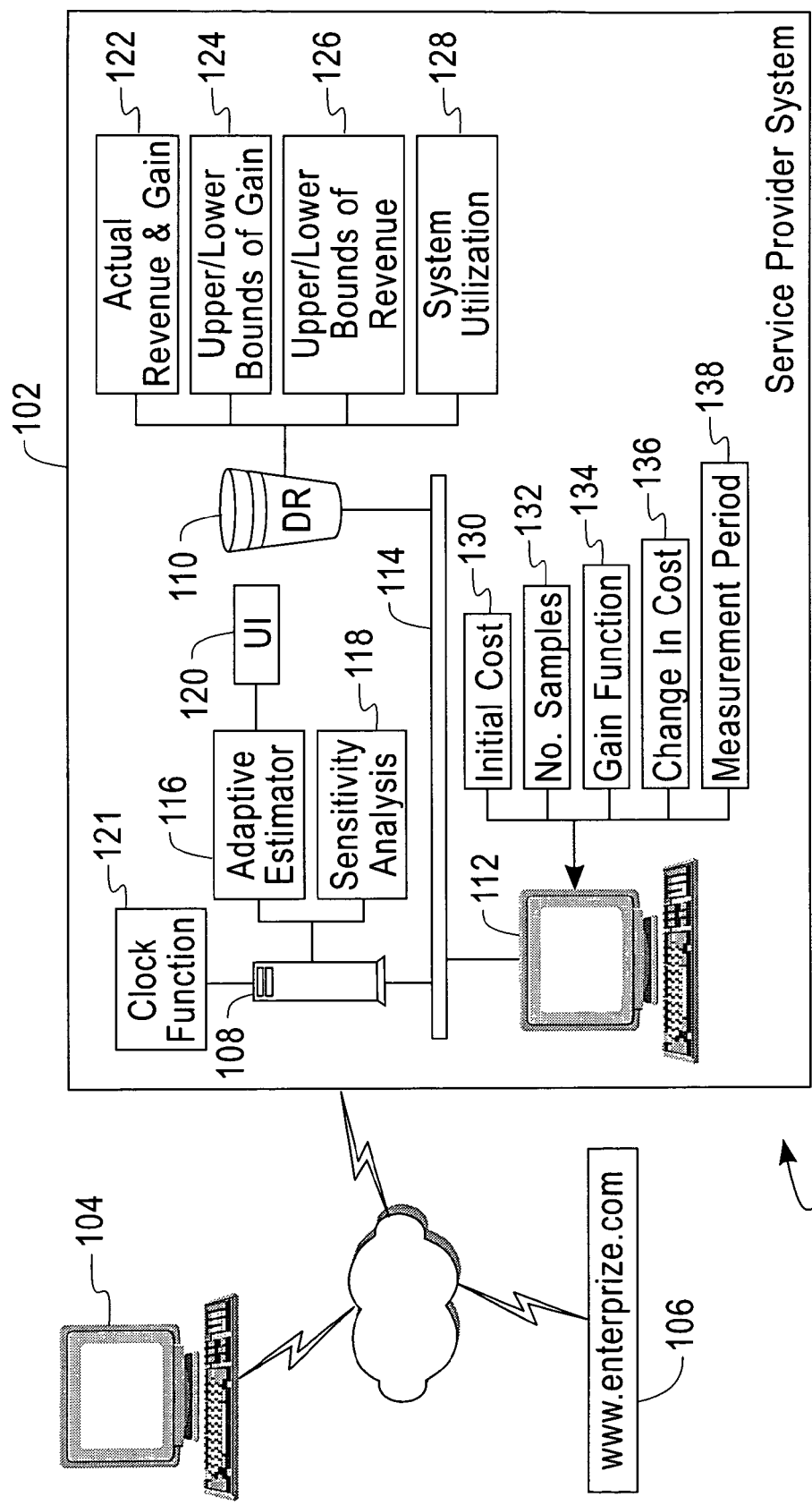
FIG. 1 is a block diagram of a system upon which the adaptive estimator model may be utilized in exemplary embodiments.

Referring to FIG. 1, a network system 100 upon which the adaptive estimator system may be implemented will now be described. The network system 100 includes a service provider system 102 in communication with a client system 104 and a customer entity 106 via a communication network. The communication network may be a local network such as an Intranet or may be a global network such as the Internet.

The service provider system 102 represents a service provider that provides web-hosting services to the customer entity 106. Small businesses with limited technology resources often utilize service providers for various web services for a fee such as data processing, website hosting, search engine subscriptions, data storage, etc.

The service provider system 102 includes a server 108, a data repository 110, and a computer device 112 in communication with each other via a network link or communication cable 114. The server 108 may comprise any processor capable of handling the activities conducted on behalf of the customer entity 106. The server 108 executes an adaptive estimator system 116 and a sensitivity analysis 118, both of which are described in more detail further herein. Additionally, the adaptive estimator system 116 includes a user interface 120 that enables a user of the computer device 112 to access the features and functions of the adaptive estimator system 116. The network link 114 may comprise an Intranet or similar network architecture that enables the server 108, the data repository 110, and the computer device 112 to communicate. It will be understood by those skilled in the art that the server 108, the data repository 110, and the computer device 112 may comprise a single unit such as, for example, a mainframe computer. Three separate units are shown in FIG. 1 for illustrative purposes and should not be construed to be limiting in scope. In case of a single unit, network link 114 would not be required.

The computer device 112 may comprise a desktop, laptop, workstation or other similar device that shares the data with the server 108. A user of the computer device 112 inputs various data at the beginning of a measurement period T.

These inputs include an initial value 130 for the total cost C for a project or other subject of measurement, a number 132 of samples, also referred to herein as clock cycles, for the measurement period T, a gain function 134, and a duration 138 of the measurement period T. Thus, if the user inputs twelve as the number 132 of samples for the duration 138 of the measurement period T of twenty-four hours, this would result in twelve two-hour cycles. These inputs are described further herein.

The data repository 110 refers to a storage device that houses the data received from the server 108 or the computer device 112. Some of the data stored by the data repository 110 include revenue and gain information 122, upper and lower bounds 124 of the gain g, upper and lower bounds 126 of the revenue r, and system utilization information 128. The data 122-128 will be described in more detail further herein.

The system utilization information 128 comprises the ratio of used capacity to full capacity of a system such as a server operating within the customer entity 106. For example, if a server operating within the customer entity 106 executes at 100 MIPS per minute, and 60 MIPS are used instantaneously, the instantaneous system utilization for this server is 60%. A system's averaged system utilization is obtained by capturing the system utilization information 128 at each clock cycle and recursively averaging the captured system utilization information over several clock cycles. An enterprise may use this system utilization information 128 to adjust its planning, scheduling, or operations procedures. These and other features are described further herein.

The customer entity 106 refers to an entity that utilizes the services of the service provider system 102. For example, the customer entity 106 may be an enterprise for which the service provider system 102 acts as a host for the enterprise's website. The service provider system 102 then charges a fee for this service. It may be that the customer entity 106 is charged each time a remote user such as the client system 104 accesses the website of the customer entity 106. This access may then be tracked and measured by the adaptive estimator system 116. The client system 104 may comprise a web-enabled computer device such as a personal computer, a laptop, or other similar system.

In alternative embodiments, the service provider system 102 may be a manufacturing enterprise that executes the adaptive estimator system 116 for measuring the performance associated with its manufacturing operations and calculating actual and forecasted gains, revenues, and system utilization information. Measurements may relate to performance data received from equipment operating in the enterprise, such as, for example, the number of widgets built on an assembly line. Measurements may also relate to performance data acquired by some dedicated routines. In this instance, a particular type of manufacturing equipment may be coupled to the computer device 112 that executes the adaptive estimator system 116. As indicated above, the adaptive estimator system 116 may be utilized for any environment where measurements are taken and revenue/gain data are desired. For illustrative purposes, the invention will be now described with respect to a web hosting services environment.

The adaptive estimator system 116 enables an entity such as the service provider system 102 to simulate or assess the revenue r, gain g, and the averages of measurements taken, in response to sampling a subject of measurement. The server 108 processes these samples, which may comprise any item or activity that is capable of being measured such as, for example, the number of the database requests received at a server per minute, or the number of used MIPS per hour, or the number of human resources working per day, etc.

A sample may be defined as the realization of a variable x. The numeric value resulting from this realization is herein referred to as "used units". This value is obtained by performing measurements during the measurement period T. An example of a used unit may be an average number of MIPS executed per minute. The samples are taken periodically during the measurement period T. The measurement period T refers to the defined duration 138 during which the samples are taken and processed by the adaptive estimator system 116. The measurement period T may be a work project, or a specified time period such as a day, week, or month, to name a few. The duration 138 of the measurement period T may be chosen based upon business criteria, e.g., a contract duration, an equipment lease duration, an elapsed time before a business process will be redefined, etc., but may also be selected based upon a technical criterion like the MTBF of a server, the duration of a service interval etc. The duration 138 is agreed between the service provider system 102 and the customer entity 106 and is given as input to the adaptive estimator system 116 via the computer device 112 at the beginning of the measurement period T, e.g. the start date of a contract between the service provider system 102 and the customer entity 106.

The adaptive estimator system 116 also determines a current revenue r and a current gain g after each take of samples. Based on the averages measured for the used units, the adaptive estimator system 116 also provides at each clock cycle a forecast of the upper bound and of the lower bound 124 of the gain g and a forecast of the upper bound and of the lower bound 126 of the revenue r that will be achieved during the measurement period T.

The following symbols and their descriptions are provided for use in further describing the features and functions of adaptive estimator system 116:

T duration of the measurement period per measured subject
C total cost over the subject (e.g., contract) duration T
$T_i$ duration of a measurement interval within the duration T;

$$T = \sum_{i=1}^{n} T_i$$

$C_i$ cost over the measurement interval $T_i$
n number of measurement intervals within the measurement period T If a contract for example has a duration of the measurement period T of 3 years, the duration of a measurement interval $T_i$ can e.g. be selected to be 3 months (one quarter), e.g. being a time duration during which the infrastructure costs are supposed to have a constant lease rate. This means, in this example there are 12 consecutive quarters, i.e. n=12, wherein n is the number of consecutive measurement intervals $T_i$ within the measurement period T. The sub-division of the measurement period T into measurement intervals $T_i$, $1 \leq i \leq n$ allows adjusting changes in the cost C, such as e.g. the depreciation of infrastructure cost, in each measurement interval $T_i$, this means here e.g. after each quarter.

$t_{ij}$ elapsed time between two samples during a measurement interval $T_i$;

$$T_i = \sum_{j=1}^{m_i} t_{ij}$$

$m_i$ number of samples taken during the measurement interval $T_i$ m total number of samples taken during the measurement period T $$m = \sum_{i=1}^{n} m_i$$

The elapsed time $t_{ij}$ between two samples, also referred to as sampling interval, can e.g. equal the duration of 1 day.

$\Delta c_{ij}$ change of cost during $t_{ij}$, defined as the cost deviation from $C_i/m_i$ $\Delta C_i$ change of cost during a measurement interval $T_i$;

$$\Delta C_i = \sum_{j=1}^{m_j} \Delta c_{ij}$$

x variable of used units $\mu_x$ expected value of the variable x, also called system utilization $g_{ij}(x)$ gain achieved during $t_{ij}$ when using x units; $0 \leq x \leq z_{ij}$ $z_{ij}$ number of available units during the sampling interval $t_{ij}$ $r_{ij}(x)$ revenue achieved during the sampling interval $t_{ij}$ when using x units: $r_{ij}(x)=C_i/m_i+\Delta c_{ij}+g_{ij}(x)$, $0 \leq x \leq z_{ij}$ $q_{ij}(x)$ revenue per unit achieved during the sampling interval $t_{ij}$ when using x units; $q_{ij}(x)=r_{ij}(x)/x$, $0 \leq x \leq z_{ij}$ The server 108 includes a clock function 121, which defines the elapsed time $t_{ij}$ between two consecutive samples and triggers the sampling. The total number m 132 of samples indicated for a measurement period T is also referred to herein as the total number of clock cycles, i.e., one sample is taken per clock cycle. For example, the elapsed time $t_{ij}$ between two samples may be 15 minutes when assessing the average number of MIPS in a server computing environment.

Figure 5:
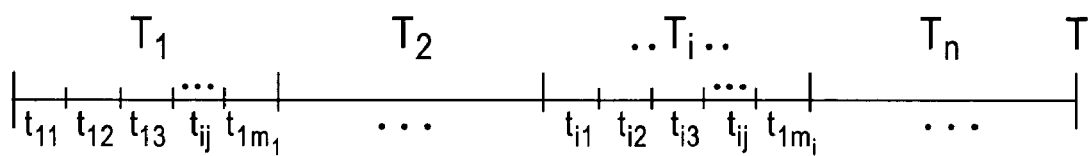
FIG. 5 shows the relation between the measurement period, measurement intervals and the sampling intervals.

Based on the pre-defined measurement period T, such as the total period of a contract, the total number m 132 of samples is defined as an initial input to the adaptive estimator system 116. FIG. 5 gives a view of the arrangement of the duration T, measurement interval $T_i$, and sampling interval $t_{ij}$ with respect to each other.

Furthermore, the adaptive estimator system 116 assumes that an initial value of the total cost C 130 of the customer entity 106 is given. This value can be a cost estimate. The total cost C 130 of the customer entity 106 represents the cost that the service provider system 102 incurs during the measurement period T in order to provide the customer entity 106 with a predetermined infrastructure. At each sample time, i.e., clock cycle, the adaptive estimator system 116 allows the service provider system 102 to adjust this total cost C 130 by a change of cost $\Delta c$ 136, as desired or needed. The total cost C 130 may change at each sample time for various reasons; however, a good estimate of the initial value of the cost C 130 may allow the service provider 102 to select for most of the m clock cycles of a measurement period T the change of cost $\Delta c=0$, which indicates no change in the total cost C 130. In an exemplary case, a reason for adjusting the total cost C 130, i.e., $\Delta c \neq 0$, might be when the infrastructure of the customer entity 106 changes, e.g., when additional MIPS become available to a server during an upgrade. The selection of the initial value of the total cost C 130 is determined by the service provider system 102 based on an internal cost calculation that is not necessarily available to the customer entity 106.

The service provider system 102 chooses an initial gain function 134 that may correspond to a desired financial profit. The initial gain function 134 represents the desired gain of the service provider system 102. Several samples for the initial gain function 134 are presented in the description of FIG. 2A further herein. If the initial gain function 134 is negative, this indicates that the service provider system 102 is making an investment in the customer entity 106.

If the initial gain function 134 is negative in a range of used units, this indicates that the service provider 102 is making an investment in the customer entity 106 for that particular usage of the units being measured.

Figure 4:
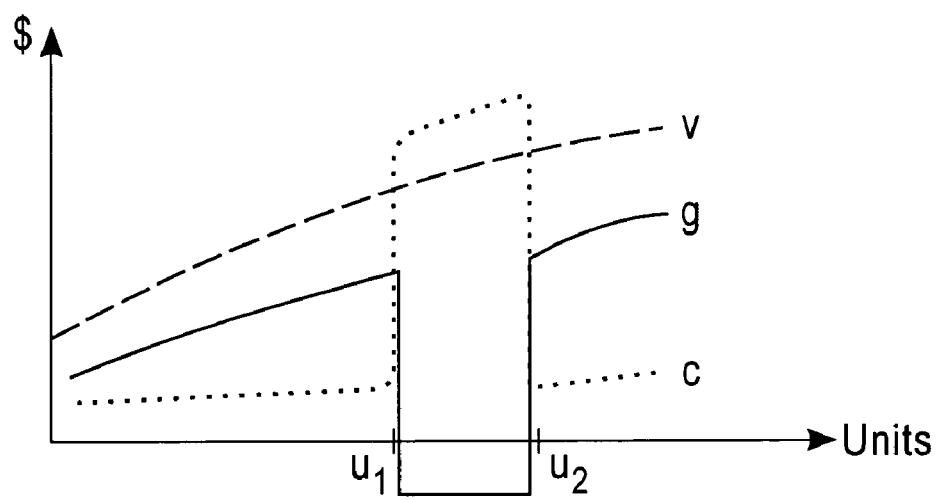
FIG. 4 shows an exemplary curve of the gain function, the cost and the revenue.

In FIG. 4 an exemplary curve of the gain function 134 is given in which within a range u1 to u2 of used units the gain function 134 is negative. The figure shows a set of corresponding curves of cost c and revenue r. Since g=r−c, the cost c is in the range u1 to u2 higher than the revenue r. A service provider may desire to allow such a relationship for instance in order to facilitate a positive gain g on a different measured subject, and in total making a positive gain g, or to make a positive gain in the ranges below u1 and above u2.

The gain function 134 is positive over the complete range of units, e.g., if 1000 MIPS are available to the customer entity 106, then the range of available units lies between 0 MIPS and 1000 MIPS, which reflects a positive gain g for the service provider system 102. The adaptive estimator system 116 allows the service provider system 102 to change the gain function 134 at each clock cycle by a gain adjustment $\Delta g(x)$. A typical example for choosing a gain adjustment $\Delta g(x)$ may be when the revenue r that corresponds to the cost C 130 of the customer entity 106 shall be kept in line with a previously agreed contract, but the cost C 130 varies more than expected. Another example in which the gain function 134 should be adjusted is, when the revenue r that corresponds to the cost C 130 of the customer entity 106 should be kept constant, and the cost C 130 increases as the service provider 102 is asked to provide more resources to the customer entity 106 due to a contract renegotiation.

The service provider system 102 also includes execution of a sensitivity analysis 118 that is used to assess the need or desirability to initiate a gain adjustment $\Delta g(x)$. For example, the gain adjustment $\Delta g(x)$ may be based upon a specified threshold of change that is determined by the result of the sensitivity analysis 118. The gain adjustment $\Delta g(x)$ may be triggered by the result of the sensitivity analysis 118, which detects the sensitivity of the gain g and the system utilization 128 to the gain adjustment $\Delta g(x)$. The sensitivity analysis 118 is described further in conjunction with FIG. 2B. Additional parameters, such as changes in the total cost C 130, may also influence the choice of the gain adjustment $\Delta g(x)$.

The adaptive estimator system 116 determines a forecast for the upper and lower bound 126 of the revenue r and a forecast for the upper and lower bound 124 of the gain g based upon a mathematically concave lower bound and a mathematically convex upper bound, respectively. A convex function is a function in which a line segment joining any two points on the curve lies on or above the curve. Conversely, a concave function is one in which a line segment joining any two points on the curve lies on or below the curve, e.g., over the interval [0,1] the function $y=\sqrt{x}$ is convex and the function $y=x^2$ is concave. Furthermore, in the interval [0,1], $y=x^2$ is a concave lower bound of y=x and $y=\sqrt{x}$ is a convex upper bound of y=x. Choosing bounds as described above enables to perform a forecast based on the system utilization as the following consideration demonstrates. More details hereto are described further herein.

The total revenue R and total gain G are determined as illustrated in the following:

The revenue $r_{ij}$ and the gain $g_{ij}$ achieved during a sampling interval $t_{ij}$ may be determined for any given clock cycle in the measurement interval $T_i$. For example, during a measurement interval $T_i$, the revenue $r_i$ is given by $r_i = C_i + \Delta C_i$ and the gain $g_i$ is given by $$g_i = \sum_{j=1}^{m_i} g_{ij}(x)$$

with $1 \leq i \leq m_i$. The total revenue R cumulated over the entire measurement period T is defined by $R = C + G$; wherein C is the total cost defined by $$C = \sum_{i=1}^{n} C_i + \Delta C_i$$

and the total gain G cumulated over the entire measurement period T is given by $$G = \sum_{i=1}^{n} \sum_{j=1}^{m_1} g_{ij}.$$

The expected value $E[r_{ij}]$ of the revenue $r_{ij}$ is given by $E[r_{ij}(x)] = E[C_i/m_i + \Delta c_{ij} + g_{ij}(x)] = C_i/m_i + E[\Delta c_{ij}] + E[g_{ij}(x)]$.

Figure 2A:
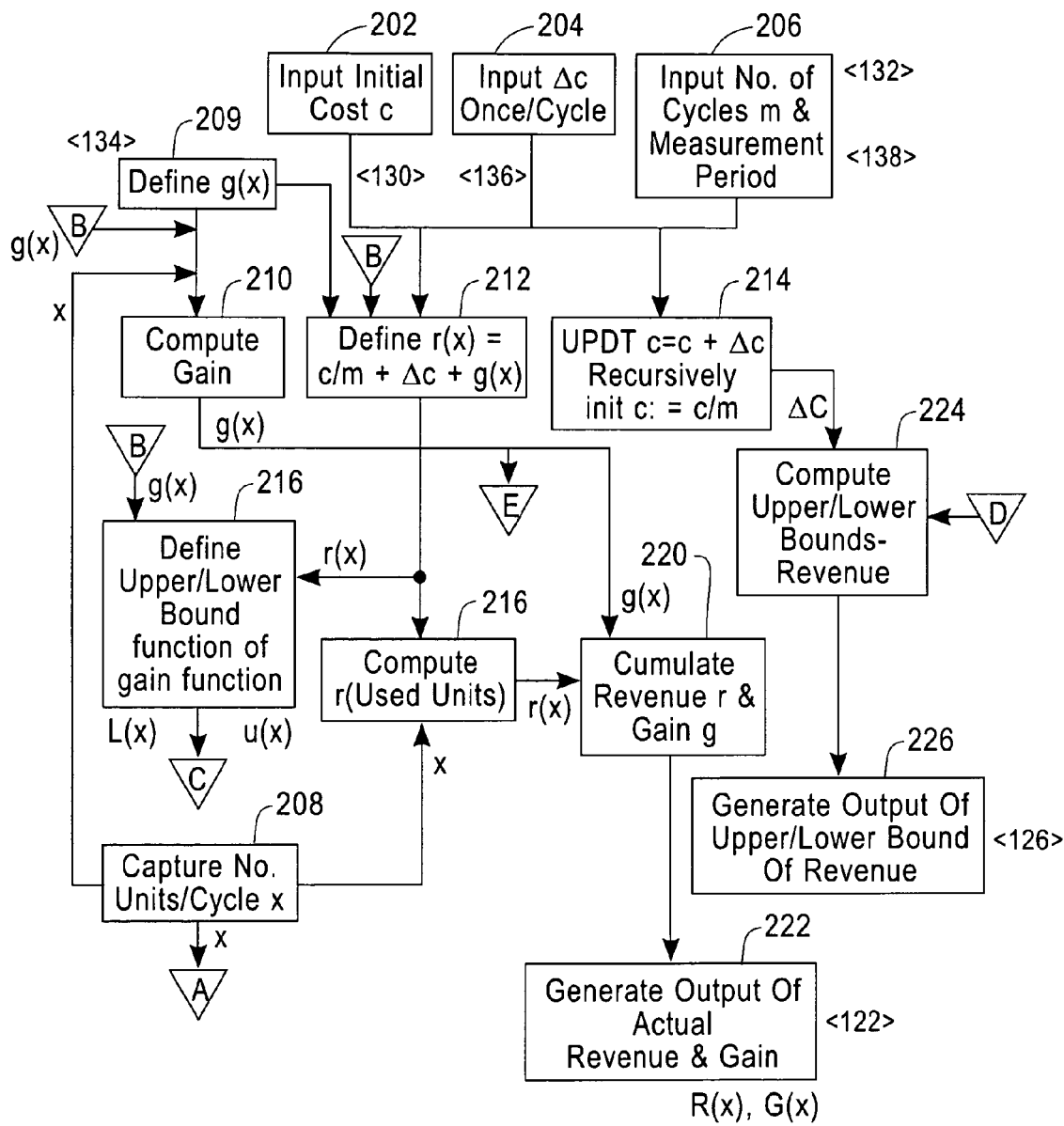
FIGS. 2A and 2B refer to a flowchart that describes the implementation of the adaptive estimator system in exemplary embodiments.
Figure 2B:
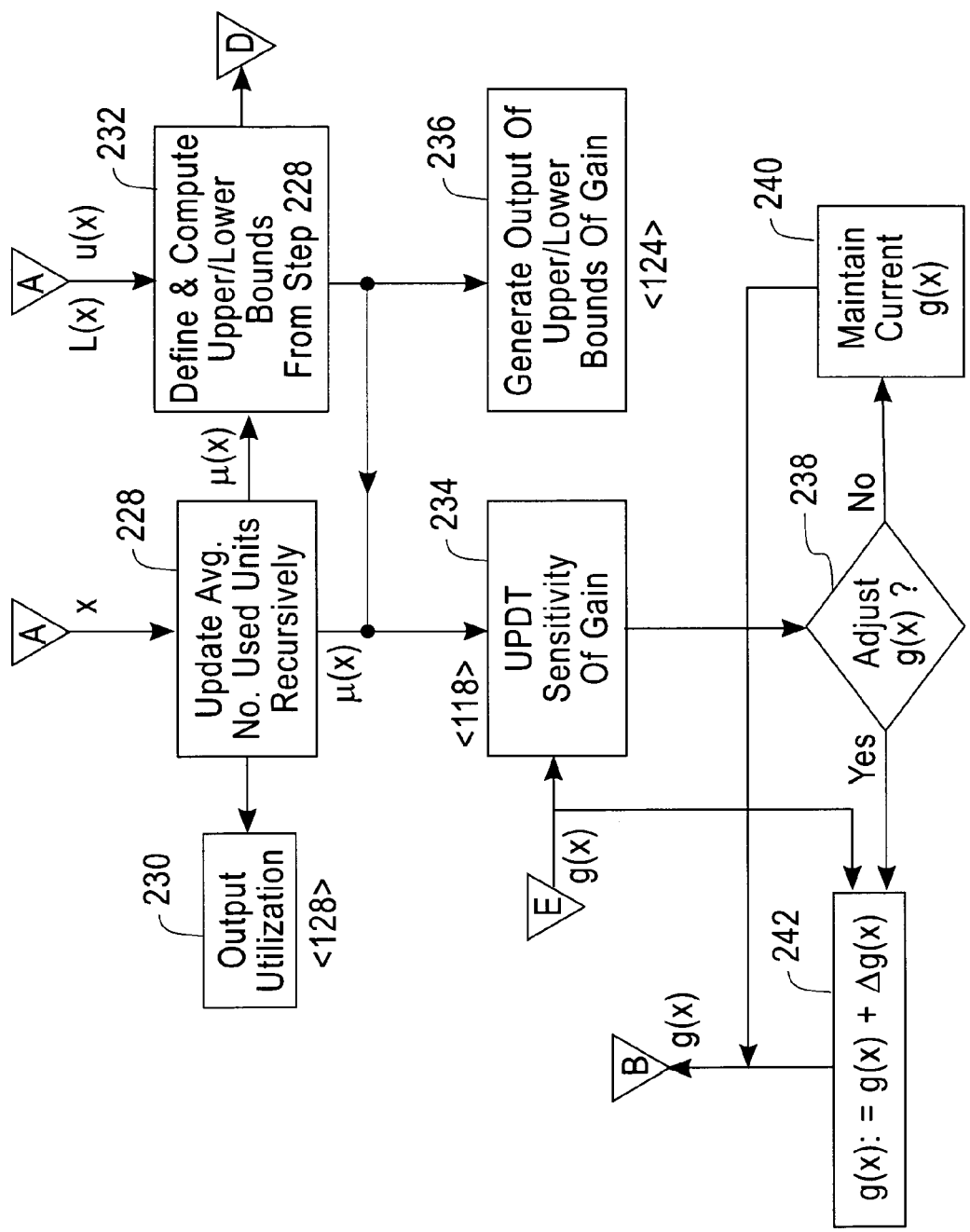

Referring now to FIGS. 2A and 2B, the implementation of the adaptive estimation method executed by the adaptive estimator system 116 will be described. As indicated in FIG. 1, some initial data input to the adaptive estimator system 116 are used. A user at the computer device 112 enters an initial value of the cost C 130 at a step 202, the number m 132 of clock cycles or samples, and the duration 138 of the measurement period T at a step 206, and the initial gain function g(x) 134 at a step 209. Two typical examples of the initial gain function g(x) 134 that can be used by the adaptive estimator system 116 are:

$$g(x) = \begin{cases} g = const, & 0 \leq x \leq x_0 \\ g + A(1 - \exp(-\lambda(x - x_0))), & x_0 < x \leq z, \end{cases} A, \lambda > 0 \quad (1)$$

$$g(x) = Bx + k \quad 0 \leq x \leq z \quad B, k \geq 0 \quad (2)$$

Both x and $x_0$ have the dimension "used units", whereas x is variable and $x_0$ is a fixed value. The value z is the number of available units. Both A and k are constants with the dimension dollar, A being positive. When choosing (1) as gain function, A+k is the maximum gain g(x) in dollars which may be achieved. The parameter $\lambda$ has the dimension "per used unit" and reflects the increase of the gain function g(x). B is a positive constant with the dimension "dollar per used unit". This example for the gain function g(x) provides a curve that is constant at k below $x_0$, and then rises to approach k+A. The curve hence has a hatch zone below $x_0$ providing therein a fixed gain g(x)=k, hence protecting the service provider system 102 against unfavorable gain g(x) in case of low use of units x. Above $x_0$ the gain g(x) increases according to an economy-of-scale development curve.

The choice of the initial gain function g(x) 134 is up to the service provider system 102 and may be selected in accordance with a desired business case. A positive initial gain function g(x) 134 provides positive gain to the service provider system 102 and a negative initial gain function g(x) 134 means that the service provider system 102 invests in the customer entity 106, hence having a negative gain g. Typical rules for the initial gain function g(x) 134 will now be described.

A criterion subject to negotiation by the service provider system 102 and the customer entity 106 can be given by:

$$q_{ij}(x) = r_{ij}(x)/x = (C_i/m_i + \Delta c_{ij} + g_{ij}(x))/x.$$

This revenue-per-used-unit function $q_{ij}(x)$ reflects for the customer entity 106 the price per unit for using x units. The customer entity 106 may want that function $q_{ij}(x)$ to be monotonic decreasing which would realize an economy of scale. This leads to a limitation in the choice for the initial gain function g(x) 134. A decreasing revenue-per-used-unit function $q_{ij}(x)$ has a negative derivation $dq_{ij}(x)/dx \leq 0$. Hence, the following relation holds:

$$dq_{ij}(x)/dx = (xdg_{ij}(x)/dx - C_i/m_i - \Delta c_{ij} - g_{ij}(x))/x^2 \leq 0$$

For the economy-of-scale case, the gain function $g_{ij}(x)$ complies with the following inequality:

$$dg_{ij}(x)/dx \leq (C_i/m_i + \Delta c_{ij} + g_{ij}(x))/x; \quad x \geq 0 \quad (3)$$

The service provider system 102, focused on its own revenue r, would typically request that the customer entity 106 signs a contract with terms designed to optimize the revenue r of the service provider system 102 while keeping in mind the notion of a customer-focused economy of scale. Thus, the service provider system 102 selects an initial gain function g(x) 134 that complies with this inequality formula (3) in order to fulfill the economy-of-scale objective of the customer entity 106. Both examples (1) and (2) of the initial gain function 134 comply with the inequality (3), and are hence suited to provide economy of scale as described above.

It is commonly accepted that the revenue r(x) grows with the number of used units x, i.e., the revenue r(x) is monotonic increasing in the number of used units x. A change in the revenue r(x) or in the cost C 130 of the customer entity 106 typically involves some renegotiation with the customer entity 106, particularly when the cost C 130 of the customer entity 106 is increasing. Conversely, when the cost C 130 of the customer entity 106 decreases, the revenue r(x) is kept at the negotiated level and the gain g(x) increases. This can be reflected by adjusting the gain g(x) by a gain adjustment $\Delta g(x) = \Delta c$ via the adaptive estimator system 116, as explained in more detail below.

The gain g(x) and the revenue r(x) typically fulfill the same monotony criteria, as long as the cost C 130 is kept constant. However, this assumption does not always hold true. Using the adaptive estimator system 116, it is initially assumed that an estimate of the cost C 130 may be determined. This cost C 130 can then be adapted at any step in the process as described in conjunction with FIGS. 2A and 2B.

The upper and lower bounds 126 of the revenue r(x) and the upper and lower bounds 124 of the gain g(x) give an indication whether further action should be taken, e.g., via the gain adjustment $\Delta g(x)$. Therefor the sensitivity analysis 118 is used as described in detail when in conjunction with the description of the steps 234, 236, 238, 240, and 242. As the choice $\Delta g(x) \neq 0$ might impact the revenue r(x), the contract between the service provider system 102 and the customer entity 106 should be designed in a way that such renegotiations are possible.

After the initial inputs 130, 132, 134 and 138, a change in cost Δc 136, if applicable, can be input to the computer device 112 once per clock cycle at a step 204.

The number x of used units per clock cycle is captured via measurement for the customer entity 106 in a step 208. The adaptive estimator system 116 determines the gain g(x) in a step 210 using the result of step 208, i.e. the number x of used units per clock cycle, together with the gain function g(x) from the step 209.

At a step 212, the adaptive estimator system 116 defines the revenue r(x) achieved as the cost C divided by the number m of samples, added to the change in cost Δc plus the gain function g(x) 134.

A convex upper bound function u(x) and a concave lower bound function l(x) of the gain function g(x) 134 are then defined at a step 216 receiving the gain function g(x) as input from a step 242 described further below. Assuming l(x) to be a concave function, such that $l(x) \leq g_{ij}(x)$, then, $\mu_x \equiv E[x]$ is the expected value of the variable x. The value $l(\mu_x)$ becomes a lower bound 124 of the expected value of the gain g(x), thus $l(\mu_x) \leq E[g_{ij}(x)]$. This result may be derived using a function such as Jensen's inequality for a concave function, namely $l(\mu_x) = l(E[x]) \leq E[l(x)]$. If a concave gain $g_{ij}(x)$ is assumed, then $g_{ij}(\mu_x)$ becomes a lower bound 124 of the expected value of the gain $E[g_{ij}(x)]$.

Assuming also that u(x) is a convex function, such that $u(x) \geq g_{ij}(x)$, in analogy to above, it may be verified that $u(\mu_x)$ is an upper bound 124 of the expected value of the gain, which means $u(\mu_x) \geq E[g_{ij}(x)]$. Furthermore, if $g_{ij}(x)$ is convex, then $g_{ij}(\mu_x)$ becomes an upper bound 124 of the expected value of the gain $E[g_{ij}(x)]$.

For a concave gain $g_{ij}(x)$, the lower bound 124 of the gain g is the gain function g itself. For a convex gain $g_{ij}(x)$, the upper bound 124 of the gain g is the gain function g itself. If the gain $g_{ij}(x)$ is concave between $x_0 \leq x \leq z$, the lower bound $l(x) = g_{ij}(x)$ and the upper bound is:

$$u(x) = g_{ij}(x_0) + \frac{g_{ij}(z) - g_{ij}(x_0)}{z - x_0}(x - x_0).$$

If the gain $g_{ij}(x)$ is convex between $x_0 \leq x \leq z$, the upper bound $u(x) = g_{ij}(x)$ and the lower bound is $$l(x) = g_{ij}(x_0) + \frac{g_{ij}(z) - g_{ij}(x_0)}{z - x_0}(x - x_0).$$

In a step 218, the adaptive estimator system 116 determines the revenue r(x) of the measured used units x by determining the value of the revenue formula defined in step 212 with the number x of used units captured from step 208. The actual revenue r(x) determined in step 218 and gain g(x) determined in step 210 are both in a step 220 cumulated to form therefrom R(x) and G(x), respectively. Cumulating here means that revenue r(x) and gain g(x) are recursively updated at step 220 and the resulting numbers R(x) and G(x) are then entered as actual revenue and gain information 122 into the data repository 110 at a step 222. The cumulation means that the value of the previous sampling interval is added to the value of the current sampling interval to provide the new valid value.

At a step 214, the adaptive estimator system 116 updates the change in cost Δc 136 recursively using the inputs received from the steps 202, 204, and 206. The input from step 202 to step 214 is provided as initial cost c 130 at the beginning of the measurement period T 138. This value does not change during the measurement period T which is here equal to the contract period. Input from the step 206 is the number of samples m 132 which are taken. This input is also provided at the beginning of the measurement period T 138. The input from step 204 is the change in cost Δc 136, which is given as input at each time when the service provider system 102 is sampled. If there is no change in cost Δc, the value of the change in cost is set to Δc=0. The forecasts for the upper and lower bounds 126 for the revenue r(x) are then determined at a step 224 at each time the service provider system 102 is sampled.

The forecast for the upper bound 126 for the revenue r(x) is derived by taking into account the change in cost Δc from the step 214. Step 224 receives the forecast for the upper bound 124 for the gain g(x) from a step 232 described in more detail herein. The forecast for the lower bound 126 for the revenue r(x) is derived by taking into account the change in cost Δc from the step 214. Step 224 receives the forecast for the lower bound 124 for the gain g(x) from the step 232. Therefore the formula of step 212 is applied. In a step 226, the forecasts for the upper and lower bounds 126 of the revenue r(x) generated during the step 224 are entered into the data repository 110.

Turning now to FIG. 2B, in a step 228 the data from the step 208, i.e. the captured number x of used units per clock cycle is used, to average the number of used units x to obtain the system utilization information 128 which is entered into the data repository 110 in a step 230. This system utilization information 128 may be used to adjust the planning, scheduling, or operations of the enterprise, e.g., making more computing power available to the customer entity 106 when the system utilization information 128 shows a higher utilization value, or removing computing power from the customer entity 106 when the system utilization information 128 shows a lower utilization value. The value, which determines whether the utilization is high or low, depends on the type of computing power used by the customer entity 106. Some preferred values of utilizations of different hardware platforms are given in the "IBM Scorpion White Paper: Simplifying the Corporate IT Infrastructure", October 2000, by David G. Heap.

The data resulting from the step 228, is the system utilization information 128 $\mu_x$ which is used in a step 232, to determine the forecasts for the upper and lower bounds 124 of the gain g(x). This step 232 further uses the convex upper bound function u(x) and the concave lower bound function l(x) of the gain function g(x) 134 that were defined in the step 216. The forecasts for the lower and upper bounds 124 of the gain g(x) are achieved by determining $l(\mu_x)$ and $u(\mu_x)$ respectively. In a step 236, these forecasts 124 for the bounds of the gain g(x) generated during step 232 are entered into the data repository 110 and provided as output.

In a step 234, the sensitivity analysis 118 is performed on the forecasts for the upper and lower bounds 124 of the gain g(x) from step 232 to determine if the gain function g(x) 134 should be adjusted. The sensitivity analysis 118 examines the history of the gain function g(x) 134 and the system utilization information 128 $\mu_x$. In step 234 are determined the values of the gain function g for the interval $[(1-\epsilon)\mu_x, (1+\epsilon)\mu_x]$, this means $g([(1-\epsilon)\mu_x, (1+\epsilon)\mu_x])$ wherein the $\epsilon$ is a predetermined positive constant value. It is typically less than 0.1. Furthermore, in step 234 are determined the upper and lower bound of the gain function g(x) for the same range of utilization, namely $u([(1-\epsilon)\mu_x, (1+\epsilon)\mu_x])$ and $l([(1-\epsilon)\mu_x, (1+\epsilon)\mu_x])$. In step 238 a determination whether to alter the gain function g(x) 134 in response to the result of the sensitivity analysis 118 is performed. If the value $l([(1-\epsilon)\mu_x])$ is smaller than a predefined minimum gain $g_{min}$ an alteration of the gain function g(x) is recommended. The minimum gain $g_{min}$ is a constant and given in a currency like USdollars by the service provider system 102, e.g. in dependence on the business case. If $l([(1-\epsilon)\mu_x]) < g_{min}$ holds, the gain adjustment $\Delta g(x)$ of step 242 is then given by $\Delta g(x) = g_{min} - l([(1-\epsilon)\mu_x])$. The realization of this gain adjustment $\Delta g(x)$ can be achieved by either reducing the cost of the service provider system 102 by this amount or by increasing the price per used unit c(x) by the amount of the gain adjustment $\Delta g(x)$. The latter can be realized by a contract renegotiation between the service provider system 102 and the customer entity 106. Other parameters may be examined as well in order to realize the advantages of the invention, e.g. parameters that are based on business objectives and policies. In such a case the parameter gain adjustment $\Delta g(x)$ is not chosen based on the mechanism described above which relies on the history of the gain g. Another possible way of choosing the gain adjustment $\Delta g(x)$ is, e.g. that the total revenue r of the service provider 102, does not grow faster than e.g. the share price of the customer entity 106 or e.g. a financial index such as the S&P 500. In other words, the sensitivity analysis 118 is then not performed on the forecasts for the upper and lower bounds 124 of the gain g(x) but on a different parameter such as a financial index. The gain adjustment $\Delta g(x)$ may then be selected to follow the temporal development of that financial index.

This sensitivity analysis 118 may be performed manually or automatically using any suitable means for analysis, such as perturbation analysis or gradient analysis. If the gain function g(x) is to be altered, the gain adjustment $\Delta g(x)$ of the gain function 134 typically is chosen such that a level of the gain g(x) that is desired by the service provider system 102 can be achieved. A typical advantageous example is given above. If in the step 238 it is determined that the gain function 134 should not be adjusted, the current gain function g(x) 134 is maintained in a step 240. Otherwise, the gain function g(x) 134 is modified by the gain adjustment $\Delta g(x)$ in a step 242 in accordance with the result of the sensitivity analysis 118 performed in step 234, and this updated gain function g(x) is returned to the step 210 for determining the new value of the gain g(x) with the number x of used units. The new gain function g(x) also replaces the former g(x) in the step 212.

The actual output data 122, 124, 126 and 128 serve the operator of the service provider system 102 to monitor the customer entity 106 from the performance point of view while using the system utilization 128 and from the financial point of view while considering actual revenue r and gain g using the output 122. The gain and revenue bounds 124 and 126 respectively give the operator an indication what he can expect as minimum and maximum respectively of gain r and revenue g. These financial data allow to verify instantaneously whether the "financial actuals" of the customer entity 106 comply with the business case of the service provider system 102. The indication of the system utilization 128 allows the operator of the service provider system 102 to take decisions whether enough computing power is available.

The data in the data repository 110 are used by the service provider 102 to calculate his revenue r and gain g and to determine the amount of the bill for the customer entity 106. In addition to that the data repository 110 may be used as a base for Total Cost of Ownership considerations. Furthermore, the data in the data repository 110 serves as data history regarding utilization and financial data, which might be used also for contract compliance proofs, audits, and the like. The historical data typically is used in case of disagreement between the service provider system 102 and the customer entity 106.

The following example that is provided for illustrative purposes only is based on the assumption that the customer entity 106 agrees with the service provider a 3 year contract, i.e. measurement period T, for the provision of servers that offer a computing power of 20,000 MIPS. A further assumption is that both parties agree within the contract on a price per MIPS, called price per unit. Based on the paradigm of economy of scale this price per unit decreases with increasing resource consumption. Usually, the service provider uses instead of the "name" price curve the name "revenue curve". In such a server environment the system utilization 128 is typically assessed by sampling the provided computing power every 15 minutes and taking the average of the 96 samples. This means the lapse time between two consecutive clocks of the clock function 121 is 24 hours, i.e. the sampling interval $t_{ij}$. As the contract has a duration 138 of 3 years the number m of samples 132 becomes 3*365=1095. Both, the service provider system 102 and the customer entity 106, know this number. Prior to mutual signature of the contract, the service provider determines his initial cost 130 and his gain function 134. He keeps both secret from the customer entity 106. The value of the installed servers decreases over time and therefore the cost c is adjusted typically at the beginning of the next contract year, being the measurement interval $T_i$. This means that at the beginning of the $2^{nd}$ and $3^{rd}$ contract year, there is a change of cost $\Delta c$ in step 204 which is smaller than zero, e.g. USD −30 m.

The averaging of the 96 samples corresponds to step 208. This value is transferred, e.g. via email; from the server environment to the service provider system 102 which performs the algorithms described previously in this text. This means, the service provider system 102 determines the revenue r and the gain g, and cumulates them. The algorithm furthermore also provides the forecasts for the upper and lower bounds 124, 126 of revenue r and gain g. The sensitivity analysis 118 gives to the service provider system 102 indications whether he should more carefully consider his gain g or revenue r or both. Furthermore, it also suggests to the service provider system 102 based on his underlying business case how to adjust the gain g. Usually the email is also sent to the customer entity 106 enabling him to assess the price he has to pay to the service provider system 102, by evaluating the price per MIPS in the "price curve", also called revenue curve, and multiplying it with the value he received in the email. At the end of each month the customer entity 106 receives from the service provider system 102 the bill. The bill can be fully transparent as the procedure described above illustrates.

Figure 3:
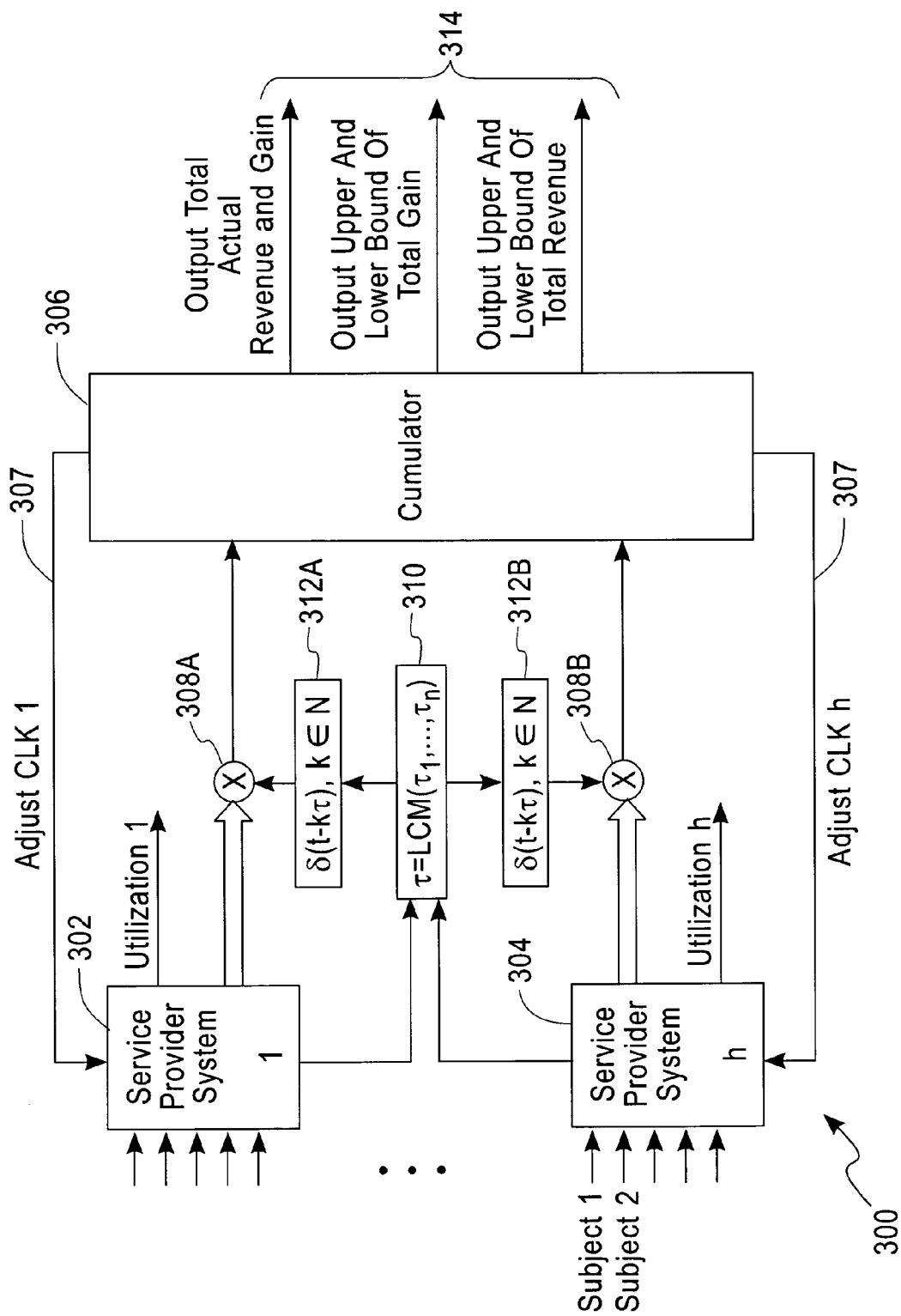
FIG. 3 is a diagram illustrating an implementation of aggregated adaptive estimator systems in accordance with alternative embodiments.

In an alternative embodiment of the invention, multiple service provider systems of the type of the service provider system 102 described above, and denoted by 302 to 304 in the following may be utilized in parallel. FIG. 3 illustrates a sample grouping of $h \geq 2$ service provider systems 302 to 304 to an aggregated service provider system 300.

Each of the h service provider systems 302 to 304 in FIG. 3 runs with a different clock, wherein $\tau_i$ is the lapse time between two consecutive clock cycles of the service provider system i, $1 \leq i \leq h$. Each service provider system i provides its lapse time $\tau_i$ to a computational engine 310. The computational engine 310 determines the Least Common Multiplier (LCM) of all h lapse times $\tau_i$. The result of this determination is the lapse time $\tau$ of the aggregated service provider system 300. In steps 312A and 312B the computational engine 310 samples the outputs of each of the service provider systems 302 to 304 at each multiple of $\tau$. This means the output of the steps 312A and 312B is the value 1 at each multiple of $\tau$, else it is the value 0. In step 308A the output of step 312A is multiplied with the output of the service provider system 302, comprising actual revenue r and actual gain g, forecasts for upper/lower bounds 124 of gain g, forecasts for upper/lower bounds 126 of revenue r. In step 308B the output of step 312B is multiplied with the output of the service provider system 304, comprising actual revenue r and actual gain g, forecasts for upper/lower bounds 124 of gain g, forecasts for upper/lower bounds 126 of revenue r. Similarly this is done for the service provider system 303, not depicted.

The sampled outputs are forwarded to a cumulator 306 that adds the actual revenue r(x) and gain g(x), the forecasts for the upper and lower bounds 124 of gain g(x), and the forecasts for the upper and lower bounds 126 of the revenue r(x) for all service provider systems 302 to 304. An analysis of the output data for revenue r and gain g may show that they deviate largely from the expectations. If the forecasts of the upper/lower bounds 124, 126 of revenue r and gain g confirm this deviation, the operator of the aggregated service provider systems 302 to 304 can use some means to reduce the deviation. Through the analysis of the data of the sensitivity analysis 118 of each service provider system 302 to 304, the operator may identify which service provider system 302 to 304 has the worst financial performance. Based on that, he may decide to take action on its gain adjustment $\Delta g(x)$.

Furthermore, the operator of the aggregated service provider systems 302 to 304, may decide to increase the sampling frequency, or in other words to adjust in a step 307 the clock, of one or more of the service provider systems 302 to 304 by an integer multiple e, which means $\tau:=\tau/e$. This change in clock has the effect that the service provider systems 302 to 304 are sampled more frequently. Especially, when the operator assumes that there are multiple short term peaks of utilization, this clock adjustment makes sense as this results in an increase of the measured system utilization 128 which positively impacts revenue r and gain g. However, the indication that such short term peaks may exist is based on heuristic consideration of the type of workload running on the respective service provider system 302 to 304. Practice has shown, that a lapse time of 15 minutes between two samples in a server environment is a well suited parameter. Based upon the description above, the cumulator 306 may modify the sampling criteria for the service provider systems 302 to 304 by changing the lapse time $\tau$ of one or more of the service provider systems 302 to 304. Therefore, the cumulator 306 has a clock adjuster to change the clock or lapse time, respectively, for each of the service provider systems 302 to 304.

As described herein, the adaptive estimator system 116 of each service provider system 102, 302 to 304 is useful in developing pricing policies. Embodiments of the invention utilize measurement of input samples and other criteria for simulating or assessing the revenue r, gain g, and the average number x of used units, i.e. system utilization 128 associated with the subject of measurement. The outputs of the service provider systems 302 to 304 are cumulated in the cumulator 306 to obtain the aggregated revenue r and gain g. Based on the utilization of each service provider system 302 to 304, the cumulator 306 provides forecasts of the total upper and a lower bound 126 of the revenue r and a total forecast of the upper and a lower bound 124 of the gain g. Each of the service provider systems 302 to 304 has the same functionality as the described service provider system 102, however with the possibility of using different input parameter settings. The suggested method is suitable for flexibly pricing an on-demand system consisting of a heterogeneous infrastructure, human resources and the like. Combining the system utilizations 128 provided by each service provider system 302 to 304 with the financial data revenue r, gain g and the respective forecasts of the total upper and a lower bound 126 of the revenue r and of the upper and a lower bound 124 of the gain g, allow the development of flexible resource allocation mechanisms while taking into account both utilization and business parameters.

As described above, the present invention can be embodied in the form of the computer-implemented processes and apparatus for practicing those processes. The present invention can also be embodied in the form of a computer program code containing instructions embodied in tangible media, such as floppy diskettes, CD-ROMs, hard drives, or any other the computer-readable storage medium, wherein, when the computer program code is loaded into and executed by a the computer, the computer becomes an apparatus for practicing the invention. The present invention can also he embodied in the form of the computer program code, for example, whether stored in a storage medium, loaded into and/or executed by a the computer, or transmitted over some transmission medium, such as over electrical wiring or cabling, through fiber optics, or via electromagnetic radiation, wherein, when the computer program code is loaded into and executed by a the computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiments disclosed for carrying out this invention, but that the invention will include all embodiments falling within the scope of the claims.

What is claimed:

1. A computer-implemented method for adaptively estimating a gain (g(x)) and a revenue r(x)), comprising the steps of:

receiving initial data for at least one subject to be measured, said initial data including a duration of a measurement period (T), a number (m) of clock cycles ($t_{ij}$) for said at least one subject during said duration of said measurement period (T), an initial value of a total cost (c) of said at least one subject over the duration of said measurement period (T), and an initial gain function (g), capturing a number (x) of used units of said subject during a current clock cycle ($t_{ij}$), determining, by a processor, the gain (g(x)) for said current clock cycle ($t_{ij}$) based upon said captured number (x) of used units and said gain function (g), said gain having an upper bound and a lower bound;

determining a revenue (r(x)) based on said received initial data (c, m, g) and said captured number (x) of used units;

performing a sensitivity analysis on the upper bound and the lower bound of the gain (g(x)), the upper bound and the lower bound of the gain (g(x)) determined based at least on average of the number (x) of the used units and a convex upper bound function and a concave lower bound function for the gain function;

using the results of the performing step in developing pricing policies associated with the subject.

2. The method of claim 1, further comprising:

receiving a value of a change in cost ($\Delta c$) between said current clock cycle ($t_{ij}$) and a previous clock cycle ($t_{ij}$);

updating said value of said total cost (c) using said received value of a change in cost (Δc).

3. The method of claim 1, further comprising:
determining a system utilization information by averaging the number (x) of used units, defining a convex upper bound function (u(x)) and a concave lower bound function (l(x)) for said gain function (g(x)), determining based on said utilization information, said convex upper bound function (u(x)), and said concave lower bound function (l(x)) a forecast for an upper bound and a lower bound of the gain (g(x)).

4. The method of claim 3, further comprising determining a forecast for an upper bound and a lower bound of the revenue (r(x)) based on the updated value of said total cost (c) and the forecast for an upper bound and a lower bound of the gain (g(x)).

5. The method of claim 1, further comprising subjecting said gain (g(x)) to a gain adjustment (Δg(x)).

6. A computer-implemented method for adaptively estimating a gain (g(x)) and a revenue r(x), comprising the steps of:
receiving initial data for at least one subject to be measured, said initial data including a duration of a measurement period (T), a number (m) of clock cycles ($t_{ij}$) for said at least one subject during said duration of said measurement period (T), an initial value of a total cost (c) of said at least one subject over the duration of said measurement period (T), and an initial gain function (g);
capturing a number (x) of used units of said subject during a current clock cycle ($t_{ij}$);
determining by a processor the gain (g(x)) for said current clock cycle ($t_{ij}$) based upon said captured number (x) of used units and said gain function (g);
determining a revenue (r(x)) based on said received initial data (c, m, g) and said captured number (x) of used units;
determining a system utilization information by averaging the number (x) of used units,
defining a convex upper bound function (u(x)) and a concave lower bound function (I(x)) for said gain function (g(x));
determining based on said utilization information, said convex upper bound function (u(x)), and said concave lower bound function (I(x)) a forecast for an upper bound and a lower bound of the gain (g(x));
determining a forecast for an upper bound and a lower bound of the revenue (r(x)) based on the updated value of said total cost (c) and the forecast for an upper bound and a lower bound of the gain (g(x));
performing a sensitivity analysis on said forecast for an upper bound and a lower bound of the gain (g(x)); and
determining said gain adjustment (Δg(x)) based on the result of said sensitivity analysis;
using said gain adjustment in developing pricing policies associated with the subject.

7. The method of claim 6, wherein said sensitivity analysis utilizes the system utilization information and the history of said gain function (g(x)) over several clock cycles ($t_{ij}$).

8. The method of claim 1, further comprising cumulating the revenue (r(x)) and the gain (g(x)) over the measurement period (T) to obtain an actual revenue (R(x)) and an actual gain (G(x)).

9. The method of claim 1, further comprising allowing the updating of said value of said total cost (c) using said received value of a change in cost (Δc) only at predetermined measurement intervals ($T_i$) within the duration of the measurement period ($T_t$).

10. A storage device readable by a machine, tangibly embodying a program of instructions executable by the machine to perform a method of adaptive estimation of a gain and a revenue, comprising:
receiving initial data for at least one subject to be measured, said initial data including a duration of a measurement period (T), a number (m) of clock cycles ($t_{ij}$) for said at least one subject during said duration of said measurement period (T), an initial value of a total cost (c) of said at least one subject over the duration of said measurement period (T), and an initial gain function (g),
capturing a number (x) of used units of said subject during a current clock cycle ($t_{ij}$),
determining the gain (g(x)) for said current clock cycle ($t_{ij}$) based upon said captured number (x) of used units and said gain function (g), said gain having an upper bound and a lower bound;
determining a revenue (r(x)) based on said received initial data (c, m, g) and said captured number (x) of used units;
performing a sensitivity analysis on the upper bound and the lower bound of the gain (g(x)), the upper bound and the lower bound of the gain (g(x)) determined based at least on average of the number (x) of the used units and a convex upper bound function and a concave lower bound function for the gain function;
using the results of the performing step in developing pricing policies associated with the subject.

11. A system for adaptive estimation of a gain (g(x)) and a revenue (r(x)), comprising:
memory;
a server processor including a clock function;
at least one adaptive estimator system executable on said server processor, said adaptive estimator system being prepared for:
receiving initial data for at least one subject to be measured, said initial data including a duration of a measurement period (T), a number (m) of clock cycles ($t_{ij}$) for said at least one subject during said duration of said measurement period (T), an initial value of a total cost (c) of said at least one subject over the duration of said measurement period (T), and an initial gain function (g),
capturing a number (x) of used units of said subject during a current clock cycle ($t_{ij}$),
determining the gain (g(x)) for said current clock cycle ($t_{ij}$) based upon said captured number (x) of used units and said gain function (g), said gain having an upper bound and a lower bound;
determining a revenue (r(x)) based on said received initial data (c, m, g) and said captured number (x) of used units;
performing a sensitivity analysis on the upper bound and the lower bound of the gain (g(x)), the upper bound and the lower bound of the gain (g(x)) determined based at least on average of the number (x) of the used units and a convex upper bound function and a concave lower bound function for the gain function;
using the results of the performing step in developing pricing policies associated with the subject.

12. The system of claim 11, wherein said adaptive estimator system is further prepared for:
receiving a value of a change in cost (Δc) between said current clock cycle ($t_{ij}$) and a previous clock cycle ($t_{ij}$);
updating said value of said total cost (c) using said received value of a change in cost (Δc).

13. The system of claim 11, wherein said adaptive estimator system is further prepared for:
determining a system utilization information by averaging the number (x) of used units, defining a convex upper bound function (u(x)) and a concave lower bound function (l(x)) for said gain function (g(x)), determining based on said utilization information, said convex upper bound function (u(x)), and said concave lower bound function (l(x)) a forecast for an upper bound and a lower bound of the gain (g(x)).

14. The system of claim 13, wherein said adaptive estimator system is further prepared for determining a forecast for an upper bound and a lower bound of the revenue (r(x)) based on the updated value of said total cost (c) and the forecast for an upper bound and a lower bound of the gain (g(x)).

15. The system of claim 13, wherein said adaptive estimator system is further prepared for subjecting said gain (g(x)) to a gain adjustment ($\Delta g(x)$).

16. The system of claim 15, wherein said adaptive estimator system is further prepared for:

performing a sensitivity analysis on said forecast for an upper bound and a lower bound of the gain (g(x)), determining said gain adjustment ($\Delta g(x)$) based on the result of said sensitivity analysis.

17. The system of claim 16, wherein said sensitivity analysis utilizes the system utilization information and the history of said gain function (g(x)) over several clock cycles ($t_{ij}$).

18. The system of claim 11, wherein said adaptive estimator system is further prepared for cumulating the revenue (r(x)) and the gain (g(x)) over the measurement period (T) to obtain an actual revenue (R(x)) and an actual gain (G(x)).

19. The system of claim 11, wherein said adaptive estimator system is further prepared for allowing the updating of said value of said total cost (c) using said received value of a change in cost ($\Delta c$) only at predetermined measurement intervals ($T_i$,) within the duration of the measurement period (T).

20. The system of claim 11, further comprising a data repository for storing therein information produced by the method.

21. The system of claim 11, further comprising a computer device usable as input/output device.

22. The system of claim 11, further comprising a user interface for enabling a user of the computer device to access the features and functions of the method.

23. The system of claim 11, further comprising an interface towards a customer entity.

24. An aggregated adaptive estimator system comprising several systems in accordance with claim 11 arranged in parallel.

25. The aggregated adaptive estimator system of claim 24 wherein the systems are runnable with different lapse times ($\tau_i$).

26. The adaptive estimator system of claim 25 further comprising a computational engine for determining a lapse time ($\tau$) of the aggregated adaptive estimator system.

27. The adaptive estimator system of claim 25 being designed to allow a clock variation for each of the systems.

28. The adaptive estimator system of claim 24 further comprising a cumulator for adding up the revenue (r(x)) and the gain (g(x)) of the systems.

* * * * *